Figure 1:
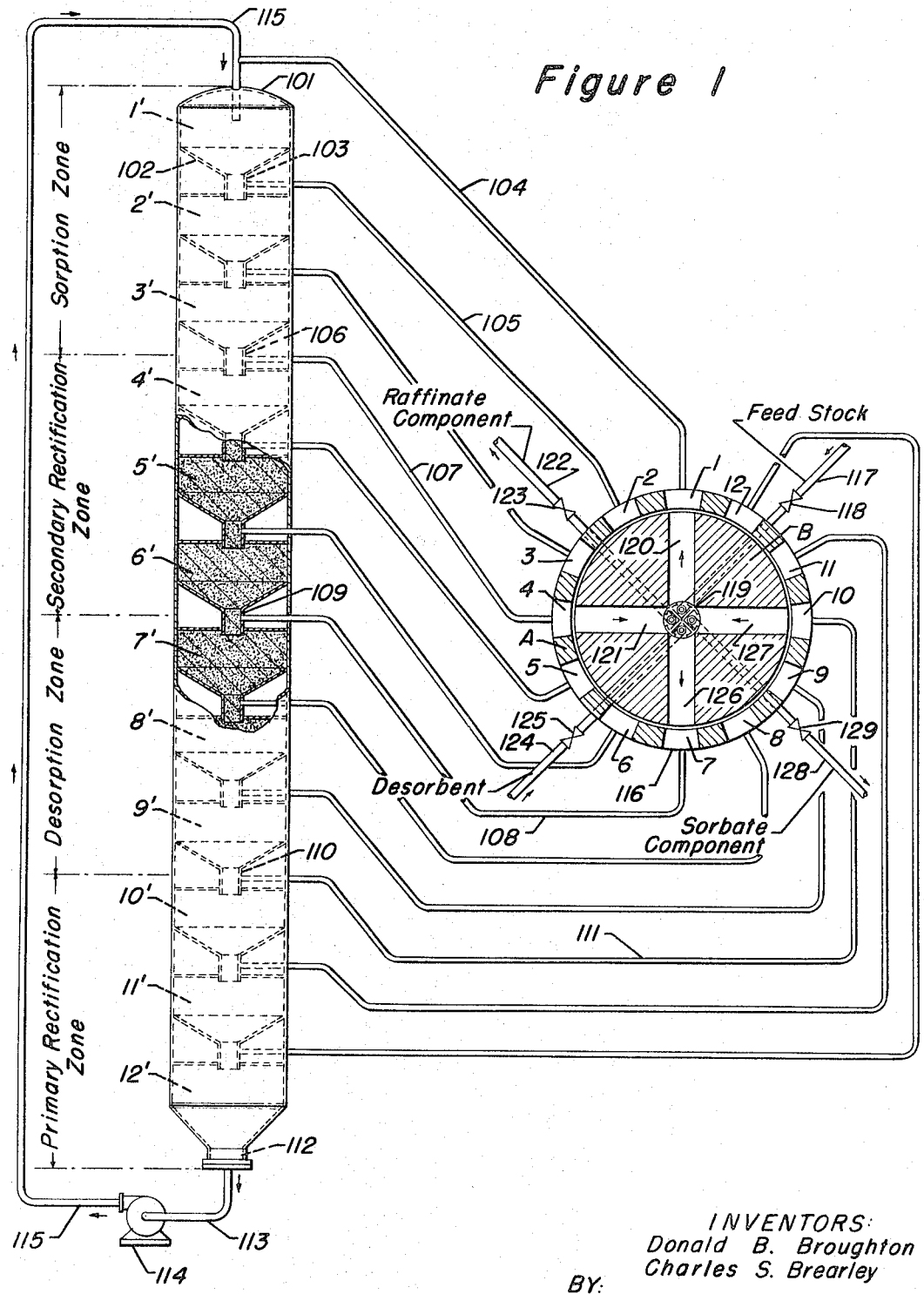

INVENTORS:
Donald B. Broughton
Charles S. Brearley
BY:
Chester J. Giuliani
Donald E. Moehling
ATTORNEYS

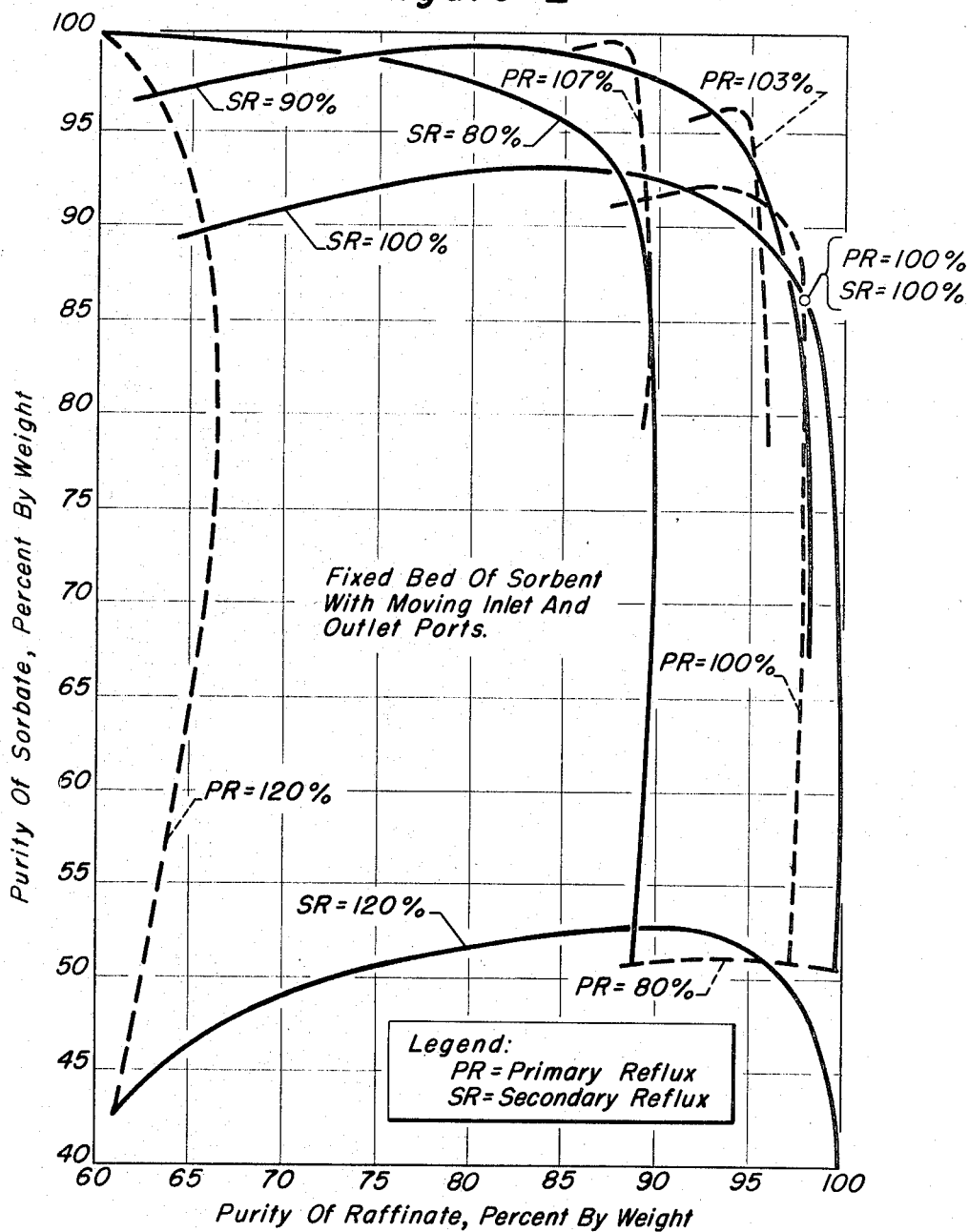

United States Patent Office 3,310,486
Patented Mar. 21, 1967

3,310,486
SEPARATION PROCESS FOR THE RECOVERY OF HIGH PURITY COMPONENTS OF HYDROCARBON MIXTURES
Donald B. Broughton, Evanston, and Charles S. Brearley, Lake Forest, Ill., assignors to Universal Oil Products Company, Des Plaines, Ill., a corporation of Delaware
Filed Aug. 13, 1964, Ser. No. 389,481
20 Claims. (Cl. 208—310)

This application is a continuation-in-part of our copending application, Ser. No. 98,940, filed Mar. 28, 1961, now abandoned which was a continuation-in-part of application, Ser. No. 752,766, filed Aug. 4, 1958, now abandoned.

This invention relates to a process for fractionating the components of a hydrocarbon mixture comprising structural isomers or types, said process comprising means for contacting the mixture with one or more fixed beds of solid sorbent particles having a selective capacity to recover the unsaturated and/or straight-chain components present in the mixture while rejecting the saturated, branched-chain and/or cyclic compounds, one or more of which may also be present in the feed mixture. More specifically, this invention concerns certain improvements in the continuous, cyclic process for separating the components of a mixture of compounds utilizing serially arranged, fixed beds of sorbent and moving inlets and outlets into and from the beds of sorbent, said improvements relating to the discovery of operating conditions and process techniques which ensure high degrees of purity of either the selectively sorbed component or of the raffinate. The present invention correlates the process conditions required in the foregoing process to maximize the purity of one or more components of a hydrocarbon feed stock mixture.

One object of this invention is to adapt a simulated countercurrent flow system for separating a feed stock mixture comprising fluid hydrocarbons into its constituent components utilizing solids particles of a sorbent selective for one class of components in the feed stock. Another object of this invention is to provide selective conditions for operating the process of the foregoing type whereby maximum purification of either the selectively sorbed produced stream or the relatively less sorbed raffinate may be obtained.

In one of its embodiments this invention relates to an improvement in a continuous flow separation process for resolving a mixture of hydrocarbons comprising at least two types: (1) a sorbate component selected from the group consisting of unsaturated and normal hydrocarbons and (2) a raffinate component selected from the group consisting of saturated hydrocarbons, branched-chain hydrocarbons and cyclic hydrocarbons, wherein it is desired to maximize the sorbate component purity, which process comprises contacting said mixture with a mass of solid particles of sorbent capable of selectively retaining said sorbate component of the mixture to form a spent sorbent and of rejecting the raffinate component which thereupon occupies the void spaces between adjacent particles of sorbent, removing raffinate component from the mass of sorbent at a point relatively downstream from the point of initially contacting said mixture with said sorbent, refluxing a secondary reflux portion of raffinate into the next adjacent downstream mass of sorbent, contacting said spent sorbent at a point relatively downstream from the point of removing raffinate, at desorption conditions with a desorbent having a boiling point which differs from the boiling point of said sorbate component to thereby displace sorbate hydrocarbon from the spent sorbent, withdrawing sorbate component from the mass of sorbent at a point relatively downstream from the point of charging said desorbent, refluxing a primary reflux portion of the sorbate into the next adjacent mass of sorbent downstream from the point of withdrawing sorbate component, maintaining a continuously circulating fluid stream flowing through the mass of sorbent, and shifting the points of introducing and withdrawing said streams relative to said mass of sorbent particles in a downstream direction while maintaining the same order of continuity and the same spatial relationship between said points, the improvement in said process which comprises maintaining the flow of primary reflux fluid at a volume rate sufficient to provide a volume of fluid of from greater than 100 to about 140 percent of the volume of void spaces between the particles of sorbent in said next adjacent downstream bed of sorbent, while simultaneously maintaining the flow of secondary reflux fluid at a volume rate of flow sufficient to provide a volume of fluid of from about 80 to less than 100 percent of the volume of void spaces between the particles of sorbent in the next adjacent downstream bed of sorbent.

In another of its embodiments this invention relates to an improvement in a continuous flow separation process for resolving a mixture of hydrocarbons comprising at least two types: (1) a sorbate component selected from the group consisting of unsaturated and normal hydrocarbons and (2) a raffinate component selected from the group consisting of saturated hydrocarbons, branched-chain hydrocarbons and cyclic hydrocarbons, wherein it is desired to maximize the raffinate component purity, which process comprises contacting said mixture with a mass of solid particles of sorbent capable of selectively retaining said sorbate component of said mixture to form a spent sorbent and of rejecting the raffinate component which thereupon occupies the void spaces between adjacent particles of sorbent, removing raffinate component from the mass of sorbent at a point relatively downstream from the point of initially contacting said mixture with said sorbent, refluxing a secondary reflux portion of said raffinate into the mass of sorbent downstream from the point of withdrawing raffinate component, contacting said spent sorbent at a point relatively downstream from the point of removing raffinate at desorption conditions with a desorbent having a boiling point which differs from the boiling point of said sorbate component to thereby displace sorbate hydrocarbon from the spent sorbent, withdrawing sorbate component from the mass of sorbent at a point relatively downwstream from the point of charging said desorbent, refluxing a primary reflux portion of the sorbate into the mass of sorbent downstream from the point of withdrawing sorbate component, maintaining a continuously circulating fluid stream flowing through the mass or sorbent, and shifting the points of introducing and withdrawing said stream relative to said mass of sorbent particles in a downstream direction while maintaining the same order of continuity and the same spatial relationship between said points, the improvement in said process which comprises maintaining the flow of primary reflux at a volume rate of flow sufficient to provide a volume of reflux fluid of from about 80 to less than 100 percent of the volume of void spaces between the particles of sorbent in the next adjacent downstream mass of sobent, while simultaneously maintaining the flow of secondary reflux at a volume rate of flow sufficient to provide a volume of fluid of from greater than 100 to about 140 percent of the volume of void spaces between the particles of sorbent in the next adjacent downstream bed of sorbent.

Separation processes have heretofore been devised to effect resolution of mixtures of organic compounds, the components of which differ in their molecular configuration, as, for example, the method of separating straight-chain hydrocarbons from branched-chain or cyclic hydrocarbons utilizing molecular sieve sorbents which selectively retain the straight-chain components within the pores of the sorbent. These methods generally rely upon the ability of the straight-chain compound to enter into the porous, internal structure of the sorbent, through pores or channels or between the inter-crystalline lattices of the sorbent. The straight-chain compound, referred to herein as a "sorbate" component, is thus selectively sorbed by the sorbent, which at the same time rejects the cyclic and branched-chain components of the mixture because the latter structural classes do not fit into the pores of the sorbent. The cyclic and branched-chain components, therefore, occupy the void spaces, between adjacent sorbent particles, and are referred to herein as "raffinate" components. Because these molecular sieve type separating agents are porous and generally structurally weak solids, the present fixed bed, moving inlet and outlet system of contacting the sorbent particles is especially adapted for use in systems employing such molecular sieves. The present process of separation may also be applied to other structurally unstable, activated adsorbents such as silica gel particles, various activated charcoals, activated aluminas, etc., which sorb unsaturated compounds such as olefinic, diolefinic and aromatic hydrocarbons as the sorbate components from mixtures thereof which such saturated hydrocarbons as the paraffinic and naphthenic hydrocarbons. As in the case of the molecular sieve sorbents, the unsaturated hydrocarbon sorbate retained by the activated sorbent from the feed stock may be displaced from the adsorbent by passing a desorbent stream through the mass of spent adsorbent.

The class of separating agents especially referred herein and referred to as molecular sieve sorbents are the metal alumino-silicates of the zeolite type which when dehydrated to develop a porous structure are capable of separating normal hydrocarbons from branched-chain and/or cyclic hydrocarbons. These solid, dehydrated zeolites contain in their structure having cross-sectional diameters of from about 4 to about 6 Angstrom units, depending upon the composition of the sorbent and its method of preparation. The alkali metal derivatives such as the dehydrated sodium alumino-silicates contain pores of about 4 Angstrom units which sorb polar compounds and hydrocarbons containing not more than 3 carbon atoms, while the alkaline earth metal derivatives (dehydrated to develop their porous structure) such as the dehydrated calcium alumino-silicate crystals accept into their pores straight-chain hydrocarbons having mean molecular diameters greater than 4 Angstrom units, but not the branched-chain and cyclic components of 4 or more carbon atoms per molecule which have mean molecular diameters greater than 5 Angstrom units. Thus, the dehydrated alkaline earth metal salts are especially suitable for separating mixtures of organic compounds containing normal or straight-chain components as the sorbate component and branched-chain or cyclic compounds having molecular diameters greater than 5 Angstrom units as raffinate components which occupy the void spaces between the sorbent particles. The alkali metal alumino-silicates are useful for separating hydrocarbons containing fewer than 4 carbon atoms from hydrocarbons of greater carbon atom content whether of cyclic, branched-chain or straight-chain structure. The metal alumino-silicate crystals, which are the effective separating agent, are generally embedded within a porous clay support to form larger aggregates which cause a lesser pressure drop through a bed of the particles and are most easily handled, although such fabrication into larger particles is not necessarily required for their effective use in the present separation process.

Suitable metal alumino-silicates for use in the present separation process are the dehydrated, zeolitic silicates of the alkali and alkaline earth metals prepared in a particular manner to yield crystals containing pores of the required size. These crystalline products are prepared by commingling an aqueous solution of an aluminum salt with water glass or other alkali metal silicate such as lithium or potassium silicate or with an aqueous silica sol substantially free of alkali metal ions. The alkaline earth metal alumino-silicates are produced by ion-exchange of at least a portion of the alkali metal from an alkali metal alumino-silicate, generally by immersion in an aqueous solution of an ionized alkaline earth metal salt such as calcium, magnesium, barium or strontium chloride to form a crystalline aggregate which, after dehydration and calcination, contains pores of from 4 to about 5 Angstrom units in diameter. Processes for the preparation of both the alkali metal and alkaline earth metal alumino-silicates having the foregoing molecular sieve properties are described in U.S. Patents, Nos. 2,882,243 and 2,882,244, issued to Robert M. Milton.

The present process is applicable to all methods of separation relying upon a molecular sieve adsorption type of separation effect, the term "sorption" herein being intended to include both adsorption of unsaturated or polar compounds by electrostatic forces on the surfaces of such activated solids as charcoal (especially coconut charcoal), alumina, silica gel, etc., as well as molecular sieve methods of separation employing porous dehydrated zeolites of the alkali metal and alkaline earth metal alumino-silicates.

The present process is also characterized herein as a cyclic and continuous process in which the various inlet and outlet streams flowing into or out of the sorption and stripping zones of the process are charged and withdrawn, respectively, in a substantially continuous manner without interruption in either continuity of flow or composition of the several streams. In the present fixed bed method of operation, one embodiment of which is illustrated in FIGURE 1 of the accompanying diagrams, the sorbent particles are maintained as a series of adjacent stationary beds, the fluid inlet and outlet ports being constantly shifted in a continuous and progressive sequence in a downstream direction (relative to the flow of fluid through the apparatus) by means of a manifold system of lines and valves or by means of a suitably designed, rotating valve which shifts the points of charging and withdrawing the inlet and outlet streams in accordance with a predetermined program and on a continuous and constant basis. The mass of sorbent, referred to herein, may also be maintained in the apparatus as a single, continuous bed (usually in a vertically disposed contacting column) with inlets and outlets for the various fluid streams being arranged along the length of the column.

One of the desirable features of the present process which makes it particularly advantageous as a method for separating hydrocarbon mixtures is the fact that the entire process may be operated on a substantially isothermal basis in the several stages of the process. Thus, the fluid streams entering and leaving the process flow and the solid sorbent particles are all at substantially the same temperature, markedly reducing heat loads and consumption of utilities in comparison to sorption processes involving solid sorbents heretofore utilized in the art wherein desorption is generally effected at much higher temperatures than the temperature at which the sorption stage of the process is operated. Substantial economies in heating and cooling requirements and in equipment for handling the fluid and solid streams are thereby effected by applying the present process system to the separation of such feed stocks.

In accordance with the process of this invention the separation column in which the various stages of the process are effected is divided into four serially interconnected adjacent zones which, suitably, may be defined by the boundaries of four groups of serially interconnected chambers housed within a vertical column and interconnected by pipes which transfer the continuously flowing fluid stream from one section to the next in a simulated countercurrent flow relationship to the solid which is maintained in each of the chambers as fixed beds. Although each of the four zones may be defined by separate chambers, a single continuous bed of solid sorbent in which the zones are defined by the points at which the inlet and outlet streams enter and leave the bed of sorbent is also a feasible arrangement which provides a fixed bed of solid for contact with the stream of fluid flowing through the solid particles.

A typical arrangement of the several zones comprising the present process flow for the operation of a continuous, simulated countercurrent flow, fixed bed type of separation process at a given instant of the process cycle is illustrated in the accompanying diagram, the feed stock mixture being introduced into the farthest upstream point of the so-called "sorption zone" of the process where separation of the mixture takes places by means of sorption of one or more components of the mixture on a solid sorbent, the sorption zone being relatively upstream with respect to a secondary rectification zone, the latter being upstream with respect to a desorption zone, which, in turn, is upstream relative to a primary rectification zone. Because of the cyclic flow of the fluid stream, the primary rectification zone is also upstream with respect to the aforementioned first zone in series; that is, the sorption zone.

The terms "upstream" and "downstream" as used herein indicate points of reference relative to the flow of the fluid stream countercurrent to the apparent flow of the solid particles of sorbent, a point upstream designating a point in the continuous flow of fluid already passed and a point downstream designating a point in the stream of fluid yet to be contacted with solid sorbent in a particular zone. Thus, without actually moving the fragile particles of solid sorbent, a simulated countercurrent flow system is provided relative to the flowing fluid stream. Since the flow of hydrocarbons is countercurrent relative to the solid sorbent, a point downstream in the direction of fluid flow is, in effect, upstream in the simulated flow of sorbent which is made to appear to flow by moving the points of inlet and outlet of the fluid streams in the same direction as the flow of fluid through the column.

It is to be noted that the stage of the cycle illustrated in FIGURE 1 is shown for illustrative purposes only to indicate the relationship of the various inlets and outlets and the flows of the various streams at the particular instant that the zones occupy the positions shown; at a subsequent stage of the cycle, for example, after the third downstream shift in the inlets and outlets, the sorption zone occupies the beds previously comprising the secondary rectification zone, whereupon the latter zone occupies the beds formerly comprising the desorption zone and the primary rectification zone occupies the beds formerly comprising the sorption zone. Each zone is preferably divided into a plurality of beds to thereby provide for greater control and flexibilty in the operation of the process, ultimately resulting in greater recovery of components in a state of greater purity. In the process illustrated in the accompanying diagram, each zone is comprised of three beds and in the particular stage of the cycle illustrated in FIGURE 1, the sorption zone is defined by the first three beds in series at the top of the column.

The diagram is intended for illustrative purposes only to exemplify the one embodiment of the invention relating to a fixed bed moving inlets and outlets process, no restriction of the scope of the invention to such flow means, however, being thereby necessarily intended, since the invention herein is also applicable to several alternative methods of operation, including the method in which the sorbent (if a structurally stable solid) is allowed to descend as a moving bed through the separation column having fixed inlets and outlets for the influent and effluent streams, for example, in a system in which the solid sorbent particles are elevated to the top of the column and allowed to descend through a gaseous or liquid fluid stream flowing concurrently or countercurrently through the column with respect to the moving sorbent particles.

The column in which countercurrent contact between the solid sorbent and the various fluid streams involved in the present process is effected is generally a relatively elongated tubular column 101 housing a series of superimposed compartments containing the solid sorbent as serially interconnected beds, 1' to 12'. Each of the beds is preferably a funnel-shaped compartment formed by a sloping plate 102 at the bottom of each bed and having a tube 103 at the apex of the cone-shaped plate which directs the flow of fluid into subadjacent bed 2', conduit 103 also being filled with sorbent to thereby provide a continuous bed of sorbent throughout the length of the serially arranged, superimposed beds. When the flow of the fluid stream through the apparatus is downflow, as illustrated, the influent streams enter each of the beds through pipes connected to the tubes between each of the beds. Thus, the inlet line to bed 1' is 104 and the outlet from bed 1' is line 105 which also serves as the inlet to bed 2' depending upon the stage of the cycle under consideration. Raffinate comprising the non-sorbed component of the feed stock flows out of bed 3' (the last bed in the sorption zone of the particular stage of the process illustrated in FIGURE 1) through tube 106 into line 107, while at the same time desorbent flows into the desorption zone of the process through line 108 which feeds into tube 109 and enters the top of bed 7', the first bed in the series of beds comprising the desorption zone. At the same instant that feed stock flows into bed 1' and desorbent into bed 7', desorption effluent (the sorbate component of the feed stock) flows out of the last bed of the desorption zone (bed 9') through tube 110 into line 111.

As specifically provided in the process of this invention, a portion of the raffinate effluent of the sorption zone, in an amount sufficient to provide the reflux stream for the secondary rectification zone, as hereinafter more specifically described, is permitted to continuously flow through tube 106 into the top of bed 4', which at the stage of the process illustrated in FIGURE 1 is the first bed in the series of beds comprising the secondary rectification zone. Similarly, the entire effluent of the desorption zone flowing into tube 110 is divided into two portions, a major proportion being withdrawn as one of the products or byproducts of the process through line 111 (as above described) and a second portion is allowed to continuously flow into the top of bed 10' as the primary reflux stream introduced into the primary rectification zone made up of beds 10' to 12'. The flow rates of primary reflux and secondary reflux together comprise an important variable of the present process and one of the discoveries which provides the basis of this invention is hereinafter referred to in greater detail.

In order to maintain the present process on a continuously cyclic basis, the effluent fluid removed from the bottom of bed 12', the last bed of the primary rectification zone, is withdrawn through tube 112 and pipe 113 by means of pump 114 and is thereafter conveyed through line 115 at a higher pressure into the top of bed 1'. This stream is also referred to herein as pump-around fluid and continuously varies in composition, depending upon the function of bed 12' in the particular stage of the cyclic operation.

An essential portion of the present apparatus, essential, that is, to the realization of the type of flow provided by the present method of operation, is the provision of a suitable programming device for changing the points of inlet and outlet into and from the contacting beds and for advancing each of these in equal increments in a downstream direction during the operation of the process. Any suitable form of fluid distribution center such as a manifold arrangement of valves and incoming and outgoing lines may be provided with timed, electrically operated switches to open and close the appropriate valves. The programming principle may also be suitably effected by means of a multi-channel, multi-port valve of particular design such as the design illustrated schematically in the accompanying FIGURE 1 which depicts a cross-sectional view of a plug valve 116 having a valve housing A and a revolving plug B rotatable in said housing A in fluid-sealed relationship with said housing A. The latter housing contains a number of inlet and outlet ports 1 to 12, connecting in fluid flow relationship with internal passageways inside the valve plug through which certain inlet and outlet fluid streams, hereinafter described, enter and are withdrawn from fixed beds 1' to 12' in contacting column 101. The valve plug is arranged to provide at least four passageways to accommodate at least two separate inlet streams and at least two separate outlet streams, the two inlet passageways alternating with the two outlet passageways. A third inlet stream, consisting of a fluid readily separable from the feed stock components, may also be advantageously provided and supplied through a separate inlet port and plug channel, such as a fluid which removes the feed stock from the port and line last carrying feed stock to column 101, thereby preventing contamination of product streams with feed stock when the line is used in a subsequent shift of the cycle to remove one or both of the products from the process. Although it is generally preferred to arrange the inlet and outlet passageways in the valve plug approximately 90° apart, thereby positioning the outlets and inlets on opposite sides of the plug, it is feasible to provide any suitable arrangement of ports and passageways and thereby increase or decrease the angular relationship between the respective inlet and outlet passageways, depending upon the relative number of fixed beds of sorbent to be assigned to the different stages of the operation.

Valve 116, representing a suitable programming device for the purpose aforesaid, contains a number of fluid inlet and outlet ports 1 to 12, corresponding to the number of contacting zones or fixed beds in column 101. The ports are positioned within housing A at finite and predetermined distances apart to direct inlet and outlet streams into and from column 101 to correspond to the desired program, prearranged for the process. The ports connect the passageways through the valve plug B to lines leading to the various fixed beds within column 101 and thus provide a means for directing the inlet and outlet streams into and from the appropriate lines connected to the pre-arranged contacting zones. Thus, feed stock is charged into the process through line 117 at a rate controlled by valve 118, flowing upwardly through divider partition 119 which in the stage of the operation illustrated in FIGURE 1 directs the feed stock into plug channel 120 and thence into outlet port 1, through line 104 into contacting bed 1' of the separation column. The feed stock, of course, must be supplied at a pressure greater than the pressure on the pump-around fluid entering the top of bed 1' through line 115 with which feed line 104 connects. Similarly, port 2 in the valve housing connects the port in the valve with line 105 which connects with downcomer 103 between contacting zones 1' and 2' of column 101. Since, however, no internal passageway in plug B opens into outlet port 2 (i.e., in the position of the plug illustrated in FIGURE 1), but instead, the solid portion of plug B blocks port 2 in fluid-sealed relationship thereto, no fluid flows through port 2 into line 105. In the same manner, ports 3 to 12 in the valve housing connect with their corresponding contacting zones 3' to 12' through a connecting conduit.

As the feed stock mixture flows through bed 1' and the residue thereof flows through beds 2' and 3', the sorbable component of the feed stock is removed from the fluid stream by sorption on the solid particles of sorbent contained in the contacting beds, the residue of feed stock becoming enriched in raffinate comprising (non-sorbed) component of the feed stock and previously sorbed desorbent as the fluid stream flows toward the outlet of bed 3'. The residue entering tube 106 at the outlet of bed 3' is substantially pure raffinate if sufficient sorbent capacity is provided in the sorption zone to accommodate all of the sorbate component of the feed stock at the rate of feed stock flow provided. Since none of the outlet ports 2 and 3 are connected to a channel in the valve plug through which fluid may escape from beds 1' and 2', the fluid residue continues its downstream flow through the series of beds until outlet line 107 connected to the downcomer tube 106 of bed 3' is reached, line 107 connecting through outlet port 4 in the valve housing to internal channel 121 of valve plug B. The stream of raffinate thereafter flows through separator 119 into line 22 at a rate controlled by valve 123.

The withdrawal of raffinate through valve 123, however, is maintained at a rate which forces a portion of the raffinate stream to flow past the outlet from downcomer 106 in a downstram direction into bed 4', the latter portion, herein, defined as secondary reflux. The flow rate of secondary reflux is, in accordance with this invention, as hereinafter described, less in volume than that which will displace completely the fluid residing in the void spaces between the particles of sorbent in bed 4' during the period of time that feed stock flows into bed 1' and prior to the shift in inlet and outlet points into and from the beds of sorbent if it is desired to maximize sorbate purity, that is, prior to the stage in the cycle that feed stock begins to flow into bed 2'. On the other hand if it is desired to maximize the raffinate purity, the flow rate of secondary reflux is greater in volume than that which will displace completely the fluid residing in the void spaces between the particles of sorbent as described above.

At the same time that feed stock enters bed 1' through line 104 and raffinate product is withdrawn through line 107, desorbent is charged into the process through line 124 and valve 125, the desorbent stream entering the partitioning member 119 which directs the flow of desorbent into internal valve plug channel 126, through outlet port 7 in valve housing A and thence into line 108 which conveys the desorbent stream into the top of bed 7' by connecting with downcomer tube 109. The desorbent is a material which removes the sorbate component of the feed stock from the sorbent which has been deposited or sorbed thereon during a preceding stage of the process cycle when beds 7' to 9' functioned in the process as the sorption zone and restores the sorbent to a condition in which it is receptive to the sorption of sorbate from the feed stock when the sorbent in bed 7' once again contacts feed stock in a subsequent stage of the cycle.

The desorbent utilized in the present process, as specified herein, is preferably a hydrocarbon having a boiling point which differs sufficiently from the boiling point of the sorbate component of the feed stock to enable the desorbent to be readily separated from a mixture of the desorbent with any of the feed stock components by simple distillation. Utilizing the sorbent especially preferred herein of the aforementioned metal aluminosilicate type which is especially suitable for separating normal paraffins from cyclic or branched chain hydrocarbons or hydrocarbons of less than 4 carbon atoms from hydrocarbons of greater molecular weight, the desorbent is suitably a normal hydrocarbon having one or two fewer or greater number of carbon atoms than the sorbate component of the feed stock and is preferably a normal hydrocarbon of at least one fewer carbon atom per molecule than the lowest molecular weight component of the feed stock and having a boiling point substantially less than the boiling point of the feed stock to thereby enable the desorbent to be readily recovered from either the sorbate or raffinate components of the feed stock with which it becomes mixed in the effluent streams from the process. When utilizing a sorbent in the present process of the type having surface adsorptive properties such as activated charcoal or silica gel, which separate unsaturated hydrocarbons (including aromatic types) from saturated hydrocarbons or polar organic compounds from non-polar compounds, the desorbent may be selected from a similar sorbate compound which differs in molecular weight from the feed stock sorbate, the desorption taking place by virtue of the Mass Action effect. Thus, the desorption of toluene on the "spent" adsorbent is effected by contacting the spent adsorbent with benzene which displaces the toluene into the benzene surrounding the spent sorbent particles. In thus expressing preference for the lower boiling normal aliphatic hydrocarbons for use as desorbents, it is not intended to thereby exclude normal hydrocarbons of higher boiling point than the feed stock (in which case the desorbent will be recovered by distillation from the product streams as a bottoms residue). The preferred normal aliphatic hydrocarbon desorbents of lower molecular weight than the sorbate component of the feed stock, although retained on the sorbent less tenaciously and sorbed less readily than the higher molecular weight sorbate hydrocarbon already occupying the pores of the sorbent; nevertheless, under the operating conditions of the present process and particularly under the simulated countercurrent flow conditions of this process, the higher molecular weight sorbate is displaced from the sorbent during the desorption step, mostly by virtue of the large molar excess of desorbent in and around the spent sorbent particles. The resulting Mass Action effect as the desorbent flows countercurrently through the desorption zone against the rising stream of fresh desorbent effectively accomplishes the desired displacement of sorbate by desorbent into the resulting fluid mixture. The desorbent rate of flow into the inlet of the desorption zone is maintained at a value at least sufficient to displace all of the sorbate component on or in the spent sorbent, preferably at a rate sufficient to provide at least 1.5 volumes of desorbent per volume of sorbate component in the feed stock and more preferably from about 2.5 to about 8.5 volumes of desorbent per volume of sorbate in the feed stock. In general, the minimum and maximum flow rates of desorbent essential to the realization of a raffinate produce of 95% purity and at least 90% raffinate recovery is dependent upon other process variables, including the sorbent rate (as determined by the rate of advancing the inlets and outlets into and from the separation column) and the flow rate of feed stock into the sorption zone.

As the desorbent flows through the serially arranged beds comprising the desorption zone, the solid sorbent particles containing the sorbate component of the feed stock is surrounded with fluid desorbent causing displacement or desorption of sorbate into the desorbent stream and generally, depending upon the particular sorbent and desorbent utilized in the process and the desorption conditions, the retention of desorbent within the structure of the sorbent particles. Thus, as the mixture of sorbate and desorbent continues to flow downstream into beds 8' and eventually into 9', the ratio of desorbent to sorbate in the mixture decreases until the stream flowing into the downcomer tube 110 of bed 9' is composed of substantial proportions of sorbate. Since the outlets of beds 7' and 8' into conduits outside of the separation column are blocked by the solid portions of the valve housing A closing outlet ports 8 and 9, the desorption effluent is forced to continue in a downstream direction of flow through fixed beds 7', 8' and 9'. However, the sorbate-containing stream does find an external outlet from downcomer tube 110 through line 111 which connects with outlet port 10 in the valve housing A, thereafter flowing through channel 127 in the valve plug B, through the opening provided in partitioning member 119 and into line 128 to a sorbate product receiver. The flow of the sorbate stream out of the process is controlled by valve 129 which determines the rate of withdrawal of sorbate and also the rate of sorbate flow (primary reflux) through downcomer tube 110 into bed 10', the first bed in the series of beds comprising the primary rectification zone. The rate of entry of sorbate into the latter zone, referred to herein as the primary reflux rate of flow, is a further critical process variable, the discovery of which has made feasible the operation of the process for the recovery of substantially pure product streams in yields closely approaching complete resolution of the feed stock mixture and constitutes part of the basis of the present invention. These critical process conditions will be referred to hereafter in greater detail. Suffice it to say here that by such provision for the controlled introduction of the primary reflux stream into the next downstream bed beyond the desorption zone, the void spaces between the particles of sorbent in this bed are thereby flushed of fluid (raffinate) remaining in the void spaces when in a prior stage of the process cycle, the primary rectification zone was the sorption zone into which feed stock was charged. Thus, the raffinate residue in the void spaces, after the shift in fluid inlets and outlets, would otherwise remain between the particles and become mixed with the desired sorbate product when the effluent from bed 10' entered the sorbate product effluent line, thereby contaminating the latter product with the raffinate portion of the feed stock.

The raffinate residue in the void spaces between the particles of sorbent in bed 10', by virtue of sorbate primary reflux entering the top of bed 10' when sorbate is withdrawn from bed 9' and, further, by virtue of the positive pressure head on bed 10', is hydrostatically forced into downstream bed 11' in a substantially plug flow manner due to the compact packing of the sorbent particles. Simultaneously, the fluid residue (raffinate) in the void spaces between the particles of sorbent in bed 11' is forced into bed 12' and the fluid residue (raffinate) in the void spaces between the particles of sorbent in bed 12' is also simultaneously forced from the bottom of bed 12' into recycle conduit 113, thereafter being pumped at a higher pressure through line 115 into the top of bed No. 1' where it is joined by fresh incoming feed stock charged through line 104.

It will be apparent that each of the operations hereinabove described occur substantially simultaneously as plug B of valve 116 is continuously rotated in a counterclockwise direction and that at any given instant of time thereafter each bed becomes progressively a more downstream bed with respect to the fluid stream continuously flowing upstream with respect thereto. Thus, if at any given instant bed 1' is the point which first contacts fresh feed introduced into the process, at any given point of time thereafter, following a sufficient interval to permit valve plug B in valve 116 to complete 1/12 of its rotation, zone 2' becomes the point of first contact with the feed stock and zone 1' is the last bed in the series of beds comprising the secondary rectification section of column 101. Thereafter, zones 2' through 12' become, successively, the beds of first contact. It will be noted that as the feed inlet continuously shifts, the raffinate outlet, desorbent inlet and sorbate outlet also shift in the same aliquot portion of the total cycle, and as these points shift, the composition of the fluid stream at different points and the composition of the sorbent beds also change, the raffinate component occupying the void spaces between sorbent particles only in those beds on either side of the raffinate outlet, generally only one, two or three beds beyond the raffinate outlet. Similarly, sorbate component is present in the pores of the solid sorbent occupying beds relatively upstream from the raffinate outlet so that the fluid stream reaching the bed which is the raffinate outlet in the continuously shifting point of raffinate withdrawal is essentially pure raffinate component in admixture with desorbent, and the fluid stream reaching the bed which is the sorbate outlet (also a continuously shifting point of withdrawal) is essentially pure sorbate in admixture with desorbent. These streams are contaminated only to the slight extent resulting from the residual fluid stream remaining in the lines leading from the contacting column to the valve port of a previous cycle of operation but, as hereinabove indicated, a fifth inlet stream may be provided for the valve and a channel placed in the valve plug clockwise from the feed stock channel to clear feed stock from the lines and equipment last carrying feed stock.

The flow rate of fluid in column 101 is adjusted to provide the maximum charging rate consistent with the maintenance of fixed bed conditions which is dependent upon whether gas phase or liquid phase contacting is utilized and also upon the size of the particles of sorbent and the degree of packing the sorbent in the confines of the bed of sorbent. The latter may vary in size from finely divided powders (particles up to 100 mesh size, preferably not smaller than about 50 mesh size) up to relatively large, granular particles, preferably not larger than about 2 mesh size. When utilizing gaseous feed stocks and desorbents, the charging rate is below the rate at which fluidization of the sorbent particles occurs (for example, if an upflow process is provided and if the contacting zones are not completely filled with solid sorbent) and more preferably at a rate not in excess of about 3 volumes of feed stock per volume of sorbent per minute. The preferred flow rates lie within the range of from about 0.1 to 1 to about .5 to 1 volumes of feed per volume of sorbent per minute. When utilizing liquid phase contacting conditions, the charging rate of feed stock is desirably not greater than about 1.5 volumes of feed per volume of sorbent per minute and more desirably, from about 0.01 to about 1.0 volume of feed per volume of sorbent per minute. These rates are, of course, dependent upon the size of the sorbent particles, the depth and width of the sorbent beds and other factors which are dependent upon the design of the apparatus and the process conditions.

The process variables involved in the present method of operation which are of critical importance in the realization of maximum purity of one of the product streams having purities of at least 90% and more preferably above about 95% concentration are the flow rates of the primary and secondary reflux streams. The essence of this invention is the discovery of the critical role these factors play in the foregoing product specifications, for only by maintaining both the primary and secondary reflux flow rates within the ranges herein provided is the recovery of one of the products with purities of at least 90% concentration realized. Thus, in order to maximize the sorbate purity at any given stage of the operation, the flow of purified raffinate component into the upstream bed of the secondary rectification zone (the next downstream bed from the downstream bed of the sorption zone from which purified raffinate product is withdrawn) must, in accordance with this invention, be less in volume than that required to replace all of the fluid residue residing in the void spaces between the particles of sorbent before the next shift in fluid inlets and outlets to and from the fixed beds of the separation column, and the flow of primary reflux must be greater than the volume that is required to replace all of the fluid residue residing in the void spaces in the upstream bed of the primary rectification zone. Alternatively, if it is desired to maximize the raffinate purity, the flow of purified raffinate component into the upstream bed of the secondary rectification zone must, in accordance with this invention, be greater in volume than that required to replace all of the fluid residue residing in the void spaces between the particles of sorbent before the next shift in fluid inlets and outlets to and from the fixed beds of the separation column, and the flow of primary reflux must be less than the volume that is required to replace all of the fluid residue residing in the void spaces in the upstream bed of the primary rectification zone.

In maximizing sorbate purity, flow rates of from about 80% to less than 100% of the aggregate volume of void spaces of secondary reflux and of from greater than 100% to about 140% of the aggregate volume of void spaces of primary reflux are suitable. Thus, the secondary rectification zone is in a state of under-reflux, while the primary rectification zone is in a state of over-reflux, and although there is a small decrease in the yeld recovery of sorbate from the feed stock, nevertheless, there is an enhancement of sorbate purity. There are many instances when the recovery of high purity sorbate is necessary even at the expense of yield. Such a case is in the production of normal paraffins in the $C_{10}$ to $C_{14}$ carbon number range which are then attached to an aryl group to form the hydrophobic part of a biodegradable detergent such as linear alkyl sulfonates (LAS). The use of highly branched hydrocarbons in the $C_{10}$ to $C_{14}$ range results in detergents which have enhanced resistance to biodegradability and result in stable foam formation in rivers and streams downstream of metropolitan areas in which these highly branched alkyl benzene sulfonate (ABS) detergents are used. In such an instance a substantially pure normal paraffin must be employed in making the detergent. By employing metal alumino-silicate sorbents, the process of this invention is utilized to produce substantially pure normal paraffins from a hydrocarbon mixture containing said normal paraffins.

In maximizing raffinate purity, flow rates of from about 80% to less than 100% of the aggregate volume of void spaces of primary reflux and from greater than 100% to about 140% of the aggregate volume of void spaces of secondary reflux are suitable. In this case the secondary rectification zone is in a state of over-reflux, while the primary rectification zone is in a state of under-reflux, and although there is a small decrease in the yield recovery of raffinate from the feed stock, nevertheless, there is an enhancement of raffinate purity. There are many instances when the recovery of high purity raffinate is necessary even at the expense of yield. Such a case exists when processing a feed stock in the gasoline boiling range to produce a high octane gasoline. The normal hydrocarbons have very low octane numbers compared to their corresponding branched-chain isomers (normal heptane has a research octane number of 0.0 while 2,4-dimethylpentane has a research octane number of 83.1). It is readily apparent that even small concentrations of normal paraffins in gasolines result in substantial decreases in octane number. If metal aluminosilicate sorbents are employed in the process of this invention while maintaining the secondary rectification zone in a state of over-reflux and the primary rectifying zone in a state of under-reflux, a raffinate having a high octane number and substantially no normal paraffins is ultimately produced.

When a bed is in a state of under-reflux, this means that the volume of reflux entering said bed is less than the aggregate volume of void spaces between the particles of sorbent in said bed. Likewise, when a bed is in a state of over-reflux, this means that the volume of reflux entering the bed exceeds the aggregate volume of void spaces between the particles in the latter bed. Further illustrated, if the secondary rectifying zone is in a state of under-reflux, then as the fluid front representing the line of demarcation between the desorbent fluid which occupies the void spaces in the next bed downstream from the raffinate outlet and the secondary reflux stream entering from the next upstream bed advances into the secondary rectification zone at a rate which lags behind the successive advances of fluid inlets and outlets, the front never quite reaches the bottom of the bed before the inlets and outlets are advanced to the next downstream beds. Thus, the secondary reflux stream containing some raffinate will never directly contact incoming desorbent and accordingly enter the desorption zone thereby preventing raffinate from entering the desorption zone and ultimately contaminating the sorbate product.

Likewise, if the primary rectifying zone is in a state of over-reflux, then the corresponding fluid front advances into the primary rectifying zone at a rate which leads the successive advances of fluid inlets and outlets and the front always reaches and passes the bottom of the downstream bed before the inlets and outlets are advanced into the next downstream beds. Therefore, when the inlets and outlets are advanced downstream, the outlet that carries the sorbate from the contacting column will withdraw uncontaminated sorbate the moment fluid is withdrawn from the new downstream bed. It is the joint maintenance of the secondary rectifying zone in a state of under-reflux and the primary rectifying zone in a state of over-reflux that results in the production of an enhanced purity sorbate product stream.

In order to recover the desorbent from the mixed desorbent-raffinate or desorbent-sorbate streams withdrawn from the process, it is generally preferable that the boiling point of the desorbent differs sufficiently from the feed stock components to be readily separable therefrom by suitable fractionation means such as simple distillation.

The process of this invention is operated at conditions of temperature, pressure, and under other process conditions which depend upon the particular feed stock involved, the particular sorbent or adsorbent utilized in the contacting zones and the required purity of the products. Thus, in a process for separating normal and isoparaffins or normal and cyclic compounds, the process will more desirably be effected in gaseous phase when the components of the feed stock contain fewer than about 5 carbon atoms per molecule and preferably in liquid phase for compounds of high molecular weight; otherwise, the pressure required to maintain the fluid in liquid phase may become excessive. For gaseous phase operation a suitable process temperature may vary from about 60° to about 300° C. and pressures may be within the range of from substantially atmospheric to 10 atmospheres or more. Typical liquid phase conditions are, for example, temperatures of from 0° to 200° C. and pressures of from atmospheric to 30 atmospheres or higher, depending upon the charge stock. In a typical separation such as the resolution of a mixture of aromatic hydrocarbons and aliphatic paraffins containing at least 6 carbon atoms per molecule, utilizing a silica gel adsorbent, the operation may be effected in either gaseous or liquid phase condition, at temperatures of from about 30° to about 250° C. and at pressures from substantially atmospheric to 10 atmospheres or more.

This invention is further illustrated with respect to several of its specific embodiments concerning process conditions, solid sorbent, illustrative feed stock and an illustrative desorbent in the following examples which, however, are not intended to limit the scope of the invention to the specific embodiments illustrated therein.

*Example 1*

The process of the present invention as applied to a fixed bed process flow is illustrated in the following series of comparative runs for separating a mixture consisting of 30% by weight of n-hexane and 70% by weight of branched chain hexane isomers, the same feed stock being charged in all runs for comparative purposes. One of the products of the process is a stream consisting of n-hexane concentrate (containing at least 95% by weight of n-hexane) and a second product stream of essentially n-hexane-free, branched-chain $C_6$ isomers which may be the ultimate product of the process, for example, when the objective is a motor fuel having a high octane number. The sorbent was maintained in each of the contacting zones as a series of superimposed fixed beds in which the inlets and outlets to each of the beds were shifted while the sorbent was maintained in the series of adjacent fixed beds, thereby providing, in effect, an apparent moving bed process.

The apparatus utilized in the series of runs included four vertical columns, approximately eight feet in height and three and one-half inches in diameter, each column containing six individual contacting chambers of equal size interconnected in series by fluid transfer conduits, the bottom of one column connecting through such a conduit with the top of the next adjacent column in series. Each of the six chambers in each column is a cylinder approximately fourteen inches long having a conically shaped cap at each end with a one-inch pipe in the form of a T-fitting connecting the cone at the bottom of one chamber with the cone at the top of the next subadjacent chamber, thereby providing four columns comprising a series of six stacked chambers in each column through which a fluid stream can be circulated upwardly from the bottom chamber through the superadjacent chambers. The T-pipe fittings between each chamber are connected with external lines through which separate fluid streams can be introduced into the process flow or withdrawn therefrom, as desired. A pump at the top of column No. 1 (the first column in series) transfers a portion of the liquid issuing from the top of that column into the bottom of column No. 4 in the series at a pressure of 100 pounds per square inch, a pressure sufficient to force the liquid stream upwardly through the series of chambers in the four serially connected columns, in effect, providing countercurrent flow through the series of 24 fixed beds of solid sorbent in the four columns. Each of the four vertical columns are enclosed within a housing through which air at a constant temperature of 95° C. is circulated in order to maintain all sections of the apparatus and the fluid streams therein at the same temperature.

The solid sorbent particles utilized in the following runs are molecular sieves in the form of particles of calcium alumino-silicate (Linde Air Products Company 5A Molecular Sieves) packed into each of the 24 serially connected contacting beds, each bed containing aobut 108 cubic inches of molecular sieves of such size that 90% by weight pass through a screen of sieve No. 7 but 5% are retained on a screen of sieve No. 8.

The T-shaped pipe fittings connecting adjacent chambers have a transverse inside diameter of about ¼ inch, the stem of the T-fitting providing a sidearm through which a fluid stream may be withdrawn or introduced into the beds, depending upon in which stage of the process cycle the column is operating. The sidearms from each of the connecting conduits are, in turn, connected by means of a pipe to a fluid distribution center which determines the character and composition of the fluid being charged or withdrawn into the particular chamber with which the T-joint connects. Although a series of manifolds and related valves may be provided for directing the various fluid streams into and from the chambers in the following runs, a multi-port valve of special design and construction was utilized to control the flow of feed stock and desorbent into the chambers and also to control the flow of primary and secondary reflux streams, sorbate product stream, and raffinate product stream from the column. The valve contains a plug which rotates at a constant and continuous rate, thereby regularly and continuously shifting the inlet and outlet ports for the particular beds involved in accordance with the predetermined program, permitting the flow rates of the streams into and from the various functioning sections of the process to be varied at will as required in the following investigation of the process variables.

The four serially arranged zones, each containing six beds, are arranged in the following order as to function: sorption, secondary rectification, desorption and primary rectification. Since the process is cyclic and the beds of sorbent are stationary, a series of six beds which serves one function at any given instant subsequently serves another function at a given later instant, depending upon the rate of rotation of the central distributing valve.

At a given instant in the process flow in which the feed stock enters the bottom of column 1 containing beds Nos. 1 to 6, for example, the central distributing valve directs the stream of charge stock into the sidearm of the T-pipe fitting below bed No. 6 (i.e., numbered from the top of column No. 1), opens the sidearm of the T-fitting above bed No. 1 (i.e., six beds downstream from the bed into which feed stock enters) through which an effluent stream of mixed raffinate and desorbent is withdrawn, opens the sidearm of the T-fitting below bed No. 12 (i.e., eighteen beds downstream from the bed into which feed stock enters) through which a sorbate product stream is withdrawn, opens the sidearm of the T-fitting below bed No. 18 (twelve beds downstream from the bed through which feed stock enters) for admitting desorbent into the column, and simultaneously maintains in closed position the side arms of the T-fitting above all other beds in the series. The valves in the raffinate and sorbate product withdrawal lines are set to control the rate of sorbate and raffinate product withdrawals which simultaneously determines the rate of flow of secondary and primary reflux streams into the next downstream beds serially connected to the beds from which the sorbate and raffinate streams are withdrawn. The reflux rates of flow are varied, as hereinafter indicated, to determine the effect of their flow rates on product purities and recoveries.

The liquid hydrocarbon feed stock at the above-indicated temperature of 95° C. and at a pressure of about 100 p.s.i.g. is charged through the sidearm of the T-fittings at the bottom of bed No. 6, joining an internally circulating fluid hydrocarbon stream flowing upwardly from bed No. 7 in column 2 into bed No. 6 at the bottom of column 1. Simultaneously, as feed stock enters the column through the inlet port of bed No. 6, the fluid distributing valve stops the flow of external fluid into or from beds 1–5 which are downstream from bed No. 6. Since the external outlets and inlets provided by the sidearms on the T-joint conduits connecting each of the chambers are closed by the distribution valve, the fluid stream continues to rise through the series of six superadjacent beds above the inlet to bed No. 6, toward bed No. 1. At the same instant that the feed stock is introduced into bed No. 6, the T-joint above bed No. 1 (at the top of column 1) is maintained in an open position by means of the fluid distribution valve to permit withdrawal of a mixture of raffinate and desorbent, removed at a rate hereinafter designated. This stream is divided into two portions, one of which, at a rate of flow hereinafter designated, is withdrawn from the process flow into an external fractionating column for separating an overhead comprising desorbent (thereafter recycled) from a raffinate product (bottoms) comprising isohexane isomers. The second portion which at the cycle of operation under consideration is utilized as a reflux stream into the secondary rectification zone of the process is transferred at various rates, hereinafter specified as one of the process conditions of the invention, into a recycle line and pumped at a pressure of 110 pounds per square inch into the bottom of bed No. 24 (column No. 4) in which the secondary rectification function of the process is effected, thereafter flowing upwardly through bed 24 and the superadjacent downstream beds 23 to 19, as more fully described below.

At the same instant that the feed stock inlet into bed No. 6 is in an open position and the raffinate outlet from bed No. 1 is in an open position, the T-joints below the next five upstream beds (that is, beds 7–11 in column 2) are closed by the central fluid distributing valve. Further upstream (i.e., upstream with respect to the fluid which will subsequently flow into bed 6–1) the sidearm of the T-joint below bed No. 18 at the bottom of column 3 is open to admit a stream of desorbent comprising liquid n-butane, charged at a rate hereinafter specified.

At the identical instant that the aforementioned inlets and outlets to beds Nos. 6, 18 and 24 are open, the central valve also maintains the sidearms from the T-joints below the five downstream beds above bed No. 18 (i.e., beds 17 to 13 in column 3) in closed relationship. The desorbent thus introduced into the circulating fluid stream rising upwardly through the T-joint below bed No. 18 flows downstream through beds 18 to 13, desorbing previously sorbed n-hexane from the molecular sieves. Since the external outlet ports of beds 18–13 (in a downstream direction) are closed by virtue of the operation of the central distributing valve, the stream of hydrocarbons comprising a mixture of n-butane desorbent and desorbed n-hexane flows countercurrently to the apparent flow of sorbent maintained in the series of fixed beds, the n-butane component thereof desorbing n-hexane from the "spent" sieves into the rising hydrocarbon stream until the sidearm in the T-joint connecting beds 12–13 is reached. The latter sidearm is maintained in an open position by means of the central distributing valve to permit a portion of the rising hydrocarbon stream comprising a mixture of n-butane desorbent and n-hexane sorbate product to flow out of the process, the flow rate of the latter stream being set at various rates in the following runs to determine the effect of the primary reflux rate (which is determined by the sorbate withdrawal rate) as one of the process conditions of the present separation process. The portion of the rising stream withdrawn through the sorbate outlet is charged into an external distillation column wherein the n-butane is distilled as an overhead from the mixture and n-hexane is recovered as bottoms from the still.

The rate of sorbate-desorbent mixture withdrawal is so controlled by means of the central distributing valve that a portion of the rising fluid stream flowing through the T-joint connecting beds 12 and 13 continues to flow upwardly into bed 12 to provide a stream of primary reflux in beds 12–7. The sidearms from the T-joints connecting the beds downstream from bed 18 to bed 13 in column 3 are maintained in a closed position by means of the central valve, thereby insuring downstream flow of the hydrocarbon stream.

The sorbent beds 24 to 19, inclusive, all of which are contained within column 4, constitute the secondary rectification zone of the process flow through which recycle reflux, diverted from the raffinate stream removed from bed No. 1, is permitted to flow upwardly to displace desorbent from the void spaces between adjacent particles of sorbent in beds 24 to 19. The desorbent thus displaced from the voids flows upwardly from beds 24 to 19 and thence from 19 upwardly to bed 13, the raffinate component of the reflux stream thereafter occupying the void spaces between the particles of sorbent.

It is to be emphasized that the flow of influent and effluent streams are automatically determined by the design of the central distributing valve and that such streams flow continuously and simultaneously, the plug of the central valve rotating at a rate which will provide the indicated flows for a predetermined span of time, as prescribed by the process variables. As the valve plug rotates, the valve ports opening into lines connecting the T-joints below beds Nos. 23, 5, 11 and 17 are gradually opened as the ports to lines connecting with the T-joints below beds 24 (i.e., above bed No. 1), 6, 12 and 18 are gradually closed, the continuously flowing streams thereby having outlets and inlets for accommodating the streams in uninterrupted flow as the inlets and outlets are shifted in a downstream direction of flow.

In thus shifting the influent and effluent lines into and from the beds simultaneously, equidistantly and in the same direction as the fluid stream flowing through the series of beds, a true countercurrent flow effect is achieved, the desorbent and feed stock streams, in effect, flowing upwardly against a stationary solid sorbent which is equivalent to the solid descending against a flowing stream of fluid admitted through stationary inlets. Although the shifts in feed and desorbent inlets and sorbate and raffinate outlets are continuous, each of the beds remains onstream an average, continuous period of time, hereinafter specified as a process variable, but at a rate which will provide a molecular sieve to feed stock ratio of sufficient magnitude to sorb substantially all of the normal components from the feed supplied to the process, and provide the required yield of sorbate and raffinate products in their desired degree of purity.

The following is a tabulation of data for several runs in which the process conditions were varied to determine the minimum rates of flow for the feed stock and desorbent streams to provide the above separations and product purities of 95% isohexane raffinate and 90% n-hexane sorbate with recoveries of the order indicated.

(A) Feed stock was charged at the rate of one gallon per hour (g.p.h.) into bed No. 6 and desorbent (liquid n-butane) at the rate of 1.5 g.p.h. into downstream bed No. 18. Raffinate effluent consisting of 70% by weight of $C_6$ and 30% by weight of $C_4$ was withdrawn from bed No. 1 and charged into a fractionating column packed with ¼-inch ceramic saddles, from which $C_4$ was distilled overhead, leaving a still residue consisting of $C_6$ isomers exclusively. Infrared analysis of the latter "raffinate" product indicates that it contains 4.1% by weight of n-hexane and 95.9% by weight of branched-chain hexanes.

The beds were onstream an average of 2.5 minutes each, the cycle of 24 beds being completed in about one hour.

A sorbate stream of 1.5 g.p.h. consisting of 20% by weight of $C_6$ hydrocarbons and 80% by weight of n-butane was withdrawn from the T-joint outlet above bed No. 13, the sorbate stream thus being withdrawn at the same rate as the rate of desorbent flow into the column. The $C_4$ desorbent was fractionally distilled from the sorbate stream in a separate distillation column, being recovered as an overhead therefrom. By infrared analysis the $C_6$ sorbate residue was analyzed in each run for its n-hexane content, the composition being hereafter noted in the tabulation of results.

The effluent conduit from the top of bed No. 1 (column 1) is connected by a permanent line to the bottom of bed No. 24 (column 4) through a pump which increases the pressure on the stream thus recycled from atmospheric to about 100 pounds per square inch at the inlet to bed No. 24.

The portion of the stream withdrawn from the effluent of bed No. 1 for recycle purposes is determined directly by the flow rates of the raffinate withdrawal, sorbate withdrawal, feed stock charged and desorbent charged, the rates of the latter streams being controlled to provide a raffinate recycle stream (secondary reflux) of sufficient volume of void spaces between particles of sorbent passing the inlet and outlet ports of the column by virtue of the shift of the points of influx and efflux into and from the column relative to the beds of sieve particles. The above relationship of recycle flow rate versus void spaces provides sufficient raffinate in bed 24 to displace desorbent from the void spaces between the particles with reflux consisting of the aforesaid mixture of raffinate and desorbent at approximately the same rate as the rate at which the influx and efflux outlets and inlets pass the sorbent bed.

For the present apparatus the beds, as indicated above, are packed with sieve particles of from about 7 to about 8 mesh size which provide a bed containing about 0.60 cubic foot of voids per cubic foot of overall bed volume. Since each bed contains an average volume of about 0.9625 ft. of sieve particles and the onstream time for each bed is 2.5 minutes, the flow rates of the recycle reflux into the secondary rectification zone and reflux into the primary rectification zone (also tested at rates of from 80% to 120% of the volume of void spaces) is from 0.02 to 0.03 cubic foot per minute, equal to from 9.0 to about 13.5 gallons per hour per cubic foot of sorbent. The preferred flow rate of the secondary reflux stream (recycle raffinate) is from 90% to 100% of the volume of void spaces between the particles of sorbent from the void spaces between the particles with re- of from 10 to about 11.5 gals./hr./ft.³ of sorbent). For the primary reflux stream the preferred charging rate is from 100% to 110% of the volume of void spaces between the particles of sorbent passing the feed stock inlet which, on a volumetric rate of flow basis for the present apparatus, is from 11.5 to about 12.5 gals./hr./ft.³ of sorbent.

Utilizing the above process conditions, and particularly a primary and secondary reflux rate within the above preferred range, the recovery of isohexanes (raffinate) is about 98% by weight of the isohexanes charged, the product consisting of 95% + isohexanes and less than 5% by weight of n-hexane.

The effect of varying the primary and secondary reflux rates of flow while maintaining the desorbent and feed stock rates of flow constant on the purity of the recovered sorbate and raffinate products is illustrated in the accompanying FIGURE 2 for primary and secondary rates within the range of from 80% to 120% of the volume of void spaces between particles of sorbent passing the feed inlet per unit of time. The results of these experiments, graphically plotted in FIGURE 2, indicate that when both reflux rates are 120% of the volume of void spaces in the sorbent, although some separation is realized, the purity of both the isoparaffin raffinate product and the normal paraffin sorbate product is relatively low. When the flow rate of primary reflux is maintained constant and the flow rate of secondary reflux is decreased from 120% to 80% by volume of the void spaces between particles of sorbent passing the feed inlet per unit of time, the purity of the sorbate product increases until at 80% secondary reflux the purity of sorbate product is 100%. Similarly, when the secondary reflux flow rate is maintained constant (see 120% line) and the primary reflux flow rate is decreased from 120% to 100%, the resulting raffinate purity increases. When both the sorbate and raffinate products are desired in maximum purity, a primary reflux flow rate of about 103% and a secondary reflux flow rate of about 90% of the volume of void spaces passing the feed inlet point per unit of time are approximately optimum for such operation.

The simulated circulation of molecular sieve particles countercurrent to the flow of the hydrocarbon streams in the column is obtained by shifting the inlet and outlet ports of the column simultaneously and in substantially equidistant shifts in the direction of hydrocarbon flow (thereby, in effect, shifting the sorbent particles in a downstream direction of flow at an equivalent rate). To simulate a flow of molecular sieve particles corresponding to a sorbate circulation rate of X gallons per hour, the inlet and outlet points will in one hour be moved past a quantity of sieves containing X gallons of sorbate. Since the sieves contain an average of about 60% by volume of void space and 12% by volume of pore space having an equal capacity to sorb approximately 12% by volume of sorbate, the inlet and outlet ports will make a complete cycle from a given bed back to the same bed in $$\frac{0.12 \times 11}{X} = \frac{1.32 \text{ hours}}{X}$$

If a sorbent (sieve) circulation rate is selected to provide a pore volume in the sieves to feed ratio of 0.4, and if a feed rate of one barrel per day (or 1.75 g.p.h.) is arbitrarily selected, the time for a complete cycle in the shift of inlet and outlet ports of the apparatus would accordingly be approximately 1.88 hours. Thus, in order to provide for a two-hour cycle which appears to be in the optimum range, the sorbate to feed ratio must be approximately 0.38.

Utilizing the foregoing sorbent, optimum primary and secondary reflux flow rates, and fixing the sieve circulation rate (simulated) at a value sufficient to provide an aggregate pore volume (12% of the total volume of sorbent particles) equal to 1.2 times the volume of the normal hexane component introduced into the process as feed stock mixture, the rate of desorbent (n-butane) flow into the process was varied from 0.5 to 2.5 times the rate of pore volume movement through the column (i.e., from 0.5 to 2.5 times the sorbent rate of flow times 12%) to determine the independent effect of the desorbent rate of flow on the purity and percent recovery of raffinate from the feed stock containing 70% by volume of raffinate (isohexane) and 30% by volume of sorbate (n-hexane). The effect of varying the desorbent rate of flow is indicated in the following table:

| Desorbent (n-butane) flow rate, Vols./Vol. of n-$C_6$ | Iso-$C_6$ Purity, percent by weight | Iso-$C_6$ Recovery, percent of Iso-$C_6$ in feed |
|---|---|---|
| 0.5 | 78 | 95 |
| 0.8 | 83 | 93 |
| 1.0 | 86 | 91.5 |
| 1.5 | 90 | 91 |
| 2.0 | 94 | 90.5 |
| 2.5 | 96 | 90 |

If, simultaneous with the increased rate of desorbent flow, the simulated sieve circulation rate is increased, for example, by reducing the rate of charging feed stock into the process, both the purity and recovery of iso-$C_6$ raffinate are increased. Thus, at a desorbent rate of flow of 2.0 vols./vol. of n-$C_6$ charged as feed stock and at a sieve circulation rate equal to about 1.8 times the volume of n-$C_6$ charged, the recovery of raffinate increased to 95% and the recovered n-$C_6$ has a purity of 98%.

It is evident from the foregoing observations that when the desorbent is supplied to the process at a rate which is insufficient to displace all of the sorbed normal feed stock component, recovery of sorbate component is incomplete and the n-$C_6$ retained on the molecular sieve particles tends to contaminate the raffinate stream withdrawn from the process. As the desorbent-sorbate rate is increased and approaches unity, greater proportions of sorbate are recovered through the sorbate outlet and the purity of the raffinate product also increases.

We claim as our invention:

1. An improvement in a continuous flow separation process for resolving a mixture of hydrocarbons comprising at least two types: (1) a sorbate component selected from the group consisting of unsaturated and normal hydrocarbons and (2) a raffinate component selected from the group consisting of saturated hydrocarbons, branched-chain hydrocarbons and cyclic hydrocarbons, wherein it is desired to maximize the sorbate component purity, which process comprises contacting said mixture with a mass of solid particles of sorbent capable of selectively retaining said sorbate component of said mixture to form a spent sorbent and of rejecting the raffinate component which thereupon occupies the void spaces between adjacent particles of sorbent, removing raffinate component from the mass of sorbent at a point relatively downstream from the point of initially contacting said mixture with said sorbent, refluxing a secondary reflux portion of said raffinate into a mass of sorbent downstream from the point of withdrawing raffinate component, contacting said spent sorbent at a point relatively downstream from the point of removing raffinate at desorption conditions with a desorbent having a boiling point which differs from the boiling point of said sorbate component to thereby displace sorbate hydrocarbon from the spent sorbent, withdrawing sorbate component from the mass of sorbent at a point relatively downstream from the point of charging said desorbent, refluxing a primary reflux portion of the sorbate into the mass of sorbent downstream from the point of withdrawing sorbate component, maintaining a continuously circulating fluid stream flowing through the mass of sorbent, and shifting the points of introducing and withdrawing said streams relative to said mass of sorbent particles in a downstream direction while maintaining the same order of continuity and the same spatial relationship between said points, the improvement in said process which comprises maintaining the flow of primary reflux at a volume rate of flow sufficient to provide a volume of reflux fluid of from greater than 100 to about 140 percent of the volume of void spaces between the particles of sorbent in the next adjacent downstream bed of sorbent, while simultaneously maintaining the flow of secondary reflux at a volume rate of flow sufficient to provide a volume of fluid of from about 80 to less than 100 percent of the volume of void spaces between the particles of sorbent in the next adjacent downstream bed of sorbent.

2. The process of claim 1 further characterized in that said sorbent is a metal alumino-silicate molecular sieve.

3. The process of claim 2 further characterized in that said metal alumino-silicate is an alkaline earth metal alumino-silicate, said sorbate is a normal hydrocarbon containing at least four carbon atoms per molecule and said raffinate hydrocarbon is selected from the the group consisting of branched-chain and cyclic hydrocarbons.

4. The process of claim 3 further characterized in that said desorbent is a hydrocarbon which differs in carbon atom content by at least one from the sorbate component of the feed stock mixture.

5. The process of claim 3 further characterized in that said normal hydrocarbon is a normal paraffin and said desorbent contains two carbon atoms less than the lowest molecular weight sorbate component of the feed stock mixture.

6. The process of claim 2 further characterized in that said sorbent is an alkali metal alumino-silicate dehydrated to contain pores of about 4 Angstrom units in cross-sectional diameter, said sorbate component is a hydrocarbon containing fewer than 4 carbon atoms per molecule and said raffinate is a hydrocarbon containing more than 4 carbon atoms per molecule.

7. The process of claim 1 further characterized in that said sorbent is an activated adsorbent and said sorbate component is an unsaturated hydrocarbon selected from the group consisting of olefinic and aromatic hydrocarbons and said raffinate component is a saturated hydrocarbon.

8. The process of claim 7 further characterized in that said sorbent is an activated charcoal.

9. The process of claim 7 further characterized in that said activated adsorbent is silica gel.

10. The process of claim 1 further characterized in that the desorbent is charged at a rate equal to 1.5 volumes of desorbent per volume of sorbate charged as feed stock.

11. The process of claim 1 further characterized in that said primary reflux rate of flow is from greater than 100 to 110 percent by volume of void spaces in the particles of sorbent in the first adjacent downstream mass of sorbent.

12. The process of claim 1 further characterized in that said flow rate of secondary reflux is from 90 to less than 100 percent by volume of void spaces between the particles of sorbent in the first adjacent downstream mass of sorbent.

13. The process of claim 1 further characterized in that said desorbent and said feed stock are charged in liquid phase and the temperature of the fluid in all of the stages is the same.

14. An improvement in a continuous flow separation process for resolving a mixture of hydrocarbons comprising at least two types: (1) a sorbate component selected from the group consisting of unsaturated and normal hydrocarbons and (2) a raffinate component selected from the group consisting of saturated hydrocarbons, branched-chain hydrocarbons and cyclic hydrocarbons, wherein it is desired to maximize the raffinate component purity, which process comprises contacting said mixture with a mass of solid particles of sorbent capable of selectively retaining said sorbate component of said mixture to form a spent sorbent and of rejecting the raffinate component which thereupon occupies the void spaces between adjacent particles of sorbent, removing raffinate component from the mass of sorbent at a point relatively downstream from the point of initially contacting said mixture with said sorbent, refluxing a secondary reflux portion of said raffinate into the mass of sorbent downstream from the point of withdrawing raffinate component, contacting said spent sorbent at a point relatively downstream from the point of removing raffinate at desorption conditions with a desorbent having a boiling point which differs from the boiling point of said sorbate component to thereby displace sorbate hydrocarbon from the spent sorbent, withdrawing sorbate component from the mass of sorbent at a point relatively downstream from the point of charging said desorbent, refluxing a primary reflux portion of the sorbate into the mass of sorbent downstream from the point of withdrawing sorbate component, maintaining a continuously circulating fluid stream flowing through the mass of sorbent, and shifting the points of introducing and wtihdrawing said stream relative to said mass of sorbent particles in a downstream direction while maintaining the same order of continuity and the same spatial relationship between said points, the improvement in said process which comprises maintaining the flow of primary reflux at a volume rate of flow sufficient to provide a volume of reflux fluid of from about 80 to less than 100 percent of the volume of void spaces between the particles of sorbent in the next adjacent downstream mass of sorbent, while simultaneously maintaining the flow of secondary reflux at a volume rate of flow sufficient to provide a volume of fluid of from greater than 100 to about 140 percent of the volume of void spaces between the particles of sorbent in the next adjacent downstream bed of sorbent.

15. The process of claim 14 further characterized in that said sorbent is an alkaline earth metal aluminosilicate molecular sieve, said sorbate comprises a normal hydrocarbon containing at least 4 carbon atoms per molecule and said raffinate comprises those hydrocarbons selected from the group consisting of branched-chain and cyclic hydrocarbons.

16. The process of claim 14 further characterized in that said sorbent is an activated adsorbent and said sorbate component comprises an unsaturated hydrocarbon selected from the group consisting of olefinic and aromatic hydrocarbons and said raffinate component comprises a saturated hydrocarbon.

17. The process of claim 16 further characterized in that said adsorbent in an activated charcoal.

18. The process of claim 16 further characterized in that said activated adsorbent is silica gel.

19. In a process for separating normal straight-chain hydrocarbons selected from the group consisting of straight-chain paraffins and straight-chain olefins from a hydrocarbon feed mixture containing said hydrocarbons along with non-straight-chain hydrocarbons, the steps comprising passing said mixture in liquid phase through a bed of molecular sieve adsorbent adapted to selectively adsorb said straight-chain hydrocarbons; thereafter stripping adsorbed and non-adsorbed hydrocarbons from the bed by passing therethrough an excess of a strippant liquid consisting essentially of straight-chain hydrocarbons which have the same degree of unsaturation per molecule as the adsorbed component of the feed and are higher boiling than any component of the feed; and displacing the strippant liquid from the bed by resuming passage therethrough of the hydrocarbon feed mixture, the straight-chain component in said mixture being preferentially adsorbed in the bed and thus displacing the adsorbed portion of the said higher boiling straight-chain hydrocarbon component of the strippant liquid.

20. In a process for separating normal paraffins from a hydrocarbon feed mixture containing said paraffins along with non-straight-chain hydrocarbons, the steps comprising passing said feed mixture in liquid phase through a bed of molecular sieve adsorbent adapted to selectively adsorb normal paraffins; thereafter stripping adsorbed and non-adsorbed feed hydrocarbons from the bed by passing therethrough an excess of a liquid normal paraffin strippant which is higher boiling than any component of the feed mixture; and displacing the strippant liquid from the bed by resuming passage therethrough of the liquid feed mixture, the normal paraffin component in said mixture being preferentially adsorbed in the bed and thus displacing the higher boiling normal paraffin strippant from the bed.

References Cited by the Examiner

UNITED STATES PATENTS 3,231,492  1/1966  Stine et al. _____ 208—310
3,239,455  3/1966  Lickus et al. _____ 208—310

ALPHONSO D. SULLIVAN, *Primary Examiner.*